(12) United States Patent
Tian

(10) Patent No.: US 12,124,724 B2
(45) Date of Patent: Oct. 22, 2024

(54) MEMORY MIGRATION METHOD, APPARATUS, AND COMPUTING DEVICE

(71) Applicant: Alibaba Group Holding Limited, Grand Cayman (KY)

(72) Inventor: Dianchen Tian, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 90 days.

(21) Appl. No.: 17/761,536

(22) PCT Filed: Sep. 23, 2020

(86) PCT No.: PCT/CN2020/116981
§ 371 (c)(1),
(2) Date: Mar. 17, 2022

(87) PCT Pub. No.: WO2021/057759
PCT Pub. Date: Apr. 1, 2021

(65) Prior Publication Data
US 2022/0342579 A1    Oct. 27, 2022

(30) Foreign Application Priority Data
Sep. 25, 2019 (CN) .......................... 201910913238.6

(51) Int. Cl.
*G06F 3/06* (2006.01)
(52) U.S. Cl.
CPC .......... *G06F 3/0647* (2013.01); *G06F 3/0604* (2013.01); *G06F 3/0679* (2013.01)
(58) Field of Classification Search
CPC .... G06F 3/0647; G06F 3/0604; G06F 3/0679; G06F 2009/4557; G06F 9/45558
(Continued)

(56) References Cited

U.S. PATENT DOCUMENTS

| 5,175,834 A | 12/1992 | Sawai |
| 8,671,309 B2 | 3/2014 | Raj et al. |

(Continued)

FOREIGN PATENT DOCUMENTS

| CN | 102609361 A | 7/2012 |
| CN | 103577249 A | 2/2014 |
| CN | 110096332 A | 8/2019 |

OTHER PUBLICATIONS

Chanchio Kasidit et al: "Time-Bound, Thread-Based Live Migration of Virtual Machines," 2014 14TH IEEE/ACM International Symposium on Cluster, Cloud and Grid Computing, IEEE, May 26, 2014, pp. 364-373.

(Continued)

*Primary Examiner* — Hua J Song

(57) ABSTRACT

Embodiments of this application provide a memory migration method, an apparatus, and a computing device. The method includes: creating a processing thread, a sending thread, and a traversal thread for a memory region; where the traversal thread iteratively executes a traversal operation, where the traversal operation includes traversing a dirty bitmap of the memory region and assigning a dirty page address to a corresponding processing thread; the processing thread iteratively executes a processing operation, where the processing operation includes reading dirty page data based on the assigned dirty page address, and adding round number flag information to the dirty page data to generate a to-be-migrated dirty page; and the sending thread iteratively executes a transmission operation, where the transmission operation includes sending the to-be-migrated dirty page to a destination end, and the destination end restores respective dirty page data to destination memories based on iteration (Continued)

round numbers in different to-be-migrated dirty pages. The embodiments of this application improve memory migration efficiency.

15 Claims, 9 Drawing Sheets

(58) Field of Classification Search
USPC .......................................................... 711/154
See application file for complete search history.

(56) References Cited

U.S. PATENT DOCUMENTS

| | | | |
|---|---|---|---|
| 8,904,068 | B2 | 12/2014 | Durant et al. |
| 10,990,540 | B2 | 4/2021 | Chen et al. |
| 11,531,625 | B2 | 12/2022 | Chen et al. |
| 2011/0010711 | A1 | 1/2011 | Patwardhan |
| 2014/0075137 | A1 | 3/2014 | Shin |
| 2015/0169239 | A1 | 6/2015 | Sakai |
| 2015/0317246 | A1 | 11/2015 | Xia et al. |
| 2015/0331628 | A1 | 11/2015 | Lee et al. |
| 2016/0188490 | A1 | 6/2016 | Samih |
| 2016/0267005 | A1 | 9/2016 | Natarajan et al. |
| 2018/0060100 | A1* | 3/2018 | Tsirkin ................. G06F 9/5088 |
| 2018/0157598 | A1 | 6/2018 | Chan et al. |
| 2018/0307600 | A1 | 10/2018 | Wang et al. |
| 2019/0220418 | A1 | 7/2019 | Chen et al. |
| 2019/0361825 | A1* | 11/2019 | Chafin ................. G06F 12/0868 |
| 2021/0240636 | A1 | 8/2021 | Chen et al. |

OTHER PUBLICATIONS

Sartakov Vasily A et al: "Multi-site Synchronous VM Replication for Persistent Systems with Asymmetric Read/Write Latencies", 2017 IEEE 22nd Pacific Rim International Symposium on Dependable Computing (PRDC), IEEE, Jan. 22, 2017, pp. 195-204.

Xiang Song et al: "Parallelizing live migration of virtual machines," Virtual Execution Environments, ACM, 2 Penn Plaza, Suite 701, New YORK Ny 10121-0701 USA, Mar. 16, 2013, pp. 85-95.

Xiong, Anping et al. "Research on Mechanism of Xen Virtual Machine Dynamic Migration Based on Memory Iterative Copies", Computer Science, vol. 40, No. 8, Aug. 31, 2013, ISSN: 1002-137X.

* cited by examiner

| | t0 | t1 | t2 | t3 | t4 | t5 | t6 | t7 |
|---|---|---|---|---|---|---|---|---|
| | Synchronization operation in round 1 | Traversal operation in round 1 | Compression operation in round 1 | Sending operation in round 1 | | | | |
| | | Synchronization operation in round 2 | Traversal operation in round 2 | Compression operation in round 2 | Sending operation in round 2 | | | |
| | | | Synchronization operation in round 3 | Traversal operation in round 3 | Compression operation in round 3 | Sending operation in round 3 | | |
| | | | | Synchronization operation in round 4 | Traversal operation in round 4 | Compression operation in round 4 | Sending operation in round 4 | |
| | | | | | Synchronization operation in round 5 | Traversal operation in round 5 | Compression operation in round 5 | Sending operation in round 5 |

FIG. 5

| | t0 | t1 | t2 | t3 | t4 | t5 | t6 | t7 |
|---|---|---|---|---|---|---|---|---|
| Region 1 | Synchronization operation in round 1 | Traversal operation in round 1 | Compression operation in round 1 | Sending operation in round 1 | | | | |
| Region 2 | Synchronization operation in round 1 | Traversal operation in round 1 | Compression operation in round 1 | Sending operation in round 1 | | | | |
| Region 1 | | Synchronization operation in round 2 | Traversal operation in round 2 | Compression operation in round 2 | Sending operation in round 2 | | | |
| Region 2 | | Synchronization operation in round 2 | Traversal operation in round 2 | Compression operation in round 2 | Sending operation in round 2 | | | |
| Region 1 | | | Synchronization operation in round 3 | Traversal operation in round 3 | Compression operation in round 3 | Sending operation in round 3 | | |
| Region 2 | | | Synchronization operation in round 3 | Traversal operation in round 3 | Compression operation in round 3 | Sending operation in round 3 | | |
| Region 1 | | | | Synchronization operation in round 4 | Traversal operation in round 4 | Compression operation in round 4 | Sending operation in round 4 | |
| Region 2 | | | | Synchronization operation in round 4 | Traversal operation in round 4 | Compression operation in round 4 | Sending operation in round 4 | |
| Region 1 | | | | | Synchronization operation in round 5 | Traversal operation in round 5 | Compression operation in round 5 | Sending operation in round 5 |
| Region 2 | | | | | Synchronization operation in round 5 | Traversal operation in round 5 | Compression operation in round 5 | Sending operation in round 5 |

FIG. 7

MEMORY MIGRATION METHOD, APPARATUS, AND COMPUTING DEVICE

TECHNICAL FIELD

Embodiments of this application relate to the field of computer application technologies, and in particular, to a memory migration method, an apparatus, and a computing device.

BACKGROUND

Virtual machine (Virtual Machine) live migration refers to a process of migrating a running virtual machine from one physical machine to another, during which the virtual machine can still provide services externally. The virtual machine live migration mainly includes live migrations of CPU, memory, and input/output (IO). The live migrations of CPU and IO are simple, and only their states are transferred, while memory migration is the most time-consuming part.

Currently, during memory migration, a migration thread is first created, and the migration thread copies dirty pages to a destination end in an iterative manner. With the increase of the iteration round number, the number of dirty pages decreases. When the number of dirty pages converges to a threshold, a virtual machine at a source end can be suspended, and the remaining dirty pages, CPU states, and IO states are copied to a virtual machine at a destination end. After the copy is complete, the virtual machine at the destination end resumes running, and the live migration ends.

During the migration, the migration thread executes a next round of iteration only after dirty pages at a previous round are all sent to the destination end. In each iteration process, the migration thread needs to perform a plurality of processing operations. If a bottleneck occurs in any processing operation, the memory migration efficiency will be affected.

SUMMARY

Embodiments of this application provide a memory migration method, an apparatus, and a computing device, to improve memory migration efficiency.

According to a first aspect, an embodiment of this application provides a memory migration method, including:
creating a processing thread, a sending thread, and a traversal thread for a memory region; where
the traversal thread iteratively executes a traversal operation, where the traversal operation includes traversing a dirty bitmap of the memory region and assigning a dirty page address to a corresponding processing thread;
the processing thread iteratively executes a processing operation, where the processing operation includes reading dirty page data based on the assigned dirty page address, and adding round number flag information to the dirty page data to generate a to-be-migrated dirty page; and
the sending thread iteratively executes a transmission operation, where the transmission operation includes sending the to-be-migrated dirty page to a destination end, and the destination end sequentially restores respective dirty page data to destination memories based on iteration round numbers in different to-be-migrated dirty pages.

According to a second aspect, an embodiment of this application provides a memory migration method, including:
creating a sending thread and a traversal thread for a memory region; where
the traversal thread iteratively executes a traversal operation, where the traversal operation includes traversing a dirty bitmap of the memory region, reading dirty page data based on a dirty page address, and adding round number flag information to the dirty page data to generate a to-be-migrated dirty page; and
the sending thread iteratively executes a transmission operation, where the transmission operation includes sending the to-be-migrated dirty page to a destination end, and
the destination end sequentially restores respective dirty page data to destination memories based on iteration round numbers in different to-be-migrated dirty pages.

According to a third aspect, an embodiment of this application provides a memory migration method, including:
creating a processing thread, a sending thread, a traversal thread, and a synchronization thread for a memory region; where
the synchronization thread iteratively executes a synchronization operation, where the synchronization operation includes acquiring a dirty bitmap of the memory region and sending the dirty bitmap to a corresponding traversal thread;
the traversal thread iteratively executes a traversal operation, where the traversal operation includes traversing an assigned dirty bitmap and assigning a dirty page address to the processing thread;
the processing thread iteratively executes a processing operation, where the processing operation includes reading dirty page data based on the assigned dirty page address, and adding round number flag information to the dirty page data to generate a to-be-migrated dirty page; and
the sending thread iteratively executes a transmission operation, where the transmission operation includes sending the to-be-migrated dirty page to a destination end, and the destination end sequentially restores respective dirty page data to destination memories based on iteration round numbers in different to-be-migrated dirty pages.

According to a fourth aspect, an embodiment of this application provides a memory migration method, including:
receiving at least one to-be-migrated dirty page transmitted by a source end;
parsing round number flag information in the at least one to-be-migrated dirty page to determine the iteration round number corresponding to the at least one to-be-migrated dirty page; and
sequentially restoring dirty page data in the at least one to-be-migrated dirty page to a destination memory based on the iteration round number in the at least one to-be-migrated dirty page.

According to a fifth aspect, an embodiment of this application provides a memory migration apparatus, including:
a first creation module adapted to create a processing thread, a sending thread, and a traversal thread for a memory region;
a first execution module adapted to control the traversal thread to iteratively execute a traversal operation, where the traversal operation includes traversing a dirty bitmap of the memory region and assigning a dirty page address to a corresponding processing thread;

a second execution module adapted to control the processing thread to iteratively execute a processing operation, where the processing operation includes reading dirty page data based on the assigned dirty page address, and adding round number flag information to the dirty page data to generate a to-be-migrated dirty page; and a third execution module adapted to control the sending thread to iteratively execute a transmission operation, where the transmission operation includes sending the to-be-migrated dirty page to a destination end, and the destination end sequentially restores respective dirty page data to destination memories based on iteration round numbers in different to-be-migrated dirty pages.

According to a sixth aspect, an embodiment of this application provides a memory migration apparatus, including:

a second creation module adapted to create a sending thread, and a traversal thread for a memory region;

a fourth execution module adapted to control the traversal thread to iteratively execute a traversal operation, where the traversal operation includes traversing a dirty bitmap of the memory region, reading dirty page data based on a dirty page address, and adding round number flag information to the dirty page data to generate a to-be-migrated dirty page; and a fifth execution module adapted to control the sending thread to iteratively execute a transmission operation, where the transmission operation includes sending the to-be-migrated dirty page to a destination end, and the destination end sequentially restores respective dirty page data to destination memories based on iteration round numbers in different to-be-migrated dirty pages.

According to a seventh aspect, an embodiment of this application provides a memory migration apparatus, including:

a third creation module adapted to create a processing thread, a sending thread, a traversal thread, and a synchronization thread for a memory region;

a sixth execution module adapted to control the synchronization thread to iteratively execute a synchronization operation, where the synchronization operation includes acquiring a dirty bitmap of the memory region and sending the dirty bitmap to a corresponding traversal thread;

a seventh execution module adapted to control the traversal thread to iteratively execute a traversal operation, where the traversal operation includes traversing any one of assigned dirty bitmaps and assigning a dirty page address to a corresponding processing thread;

an eighth execution module adapted to control the processing thread to iteratively execute a processing operation, where the processing operation includes reading dirty page data based on the assigned dirty page address, and adding round number flag information to the dirty page data to generate a to-be-migrated dirty page; and a ninth execution module adapted to control the sending thread to iteratively execute a transmission operation, where the transmission operation includes sending the to-be-migrated dirty page to a destination end, and the destination end sequentially restores respective dirty page data to destination memories based on iteration round numbers in different to-be-migrated dirty pages.

According to an eighth aspect, an embodiment of this application provides a memory migration apparatus, including:

a parsing module adapted to receive at least one to-be-migrated dirty page transmitted by a source end, and parse round number flag information in the at least one to-be-migrated dirty page, to determine the iteration round number corresponding to the at least one to-be-migrated dirty page; and a restoring module adapted to sequentially restore dirty page data in the at least one to-be-migrated dirty page to a destination memory based on the iteration round number in the at least one to-be-migrated dirty page.

According to a ninth aspect, a computing device provided in an embodiment of this application includes one or more processing components and one or more storage components, where the one or more processing components run source virtual machines;

the one or more storage components store one or more computer instructions, and the one or more computer instructions are to be called and executed by the one or more processing components; and the one or more processing components are adapted to:

create a processing thread, a sending thread, and a traversal thread for a memory region; where the traversal thread iteratively executes a traversal operation, where the traversal operation includes traversing a dirty bitmap of the memory region and assigning a dirty page address to a corresponding processing thread;

the processing thread iteratively executes a processing operation, where the processing operation includes reading dirty page data based on the assigned dirty page address, and adding round number flag information to the dirty page data to generate a to-be-migrated dirty page; and the sending thread iteratively executes a transmission operation, where the transmission operation includes sending the to-be-migrated dirty page to a destination end, and the destination end sequentially restores respective dirty page data to destination memories based on iteration round numbers in different to-be-migrated dirty pages.

According to a tenth aspect, a computing device provided in an embodiment of this application includes one or more processing components and one or more storage components, where the one or more processing components run source virtual machines;

the one or more storage components store one or more computer instructions, and the one or more computer instructions are to be called and executed by the one or more processing components; and the one or more processing components are adapted to:

create a sending thread and a traversal thread for a memory region; where the traversal thread iteratively executes a traversal operation, where the traversal operation includes traversing a dirty bitmap of the memory region, reading dirty page data based on a dirty page address, and adding round number flag information to the dirty page data to generate a to-be-migrated dirty page; and the sending thread iteratively executes a transmission operation, where the transmission operation includes sending the to-be-migrated dirty page to a destination end, and the destination end sequentially restores respective dirty page data to destination memories based on iteration round numbers in different to-be-migrated dirty pages.

According to an eleventh aspect, a computing device provided in an embodiment of this application includes one or more processing components and one or more storage components, where the one or more processing components run source virtual machines;

the one or more storage components store one or more computer instructions, and the one or more computer instructions are to be called and executed by the one or more processing components; and the one or more processing components are adapted to:

create a processing thread, a sending thread, a traversal thread, and a synchronization thread for a memory region; where the synchronization thread iteratively executes a synchronization operation, where the synchronization operation includes acquiring a dirty bitmap of the memory region and sending the dirty bitmap to the traversal thread;

the traversal thread iteratively executes a traversal operation, where the traversal operation includes traversing an assigned dirty bitmap and assigning a dirty page address to the processing thread;

the processing thread iteratively executes a processing operation, where the processing operation includes reading dirty page data based on the assigned dirty page address, and adding round number flag information to the dirty page data to generate a to-be-migrated dirty page; and the sending thread iteratively executes a transmission operation, where the transmission operation includes sending the to-be-migrated dirty page to a destination end, and the destination end sequentially restores respective dirty page data to destination memories based on iteration round numbers in different to-be-migrated dirty pages.

According to a twelfth aspect, a computing device provided in an embodiment of this application includes one or more processing components and one or more storage components, where the one or more processing components run source virtual machines;

the one or more storage components store one or more computer instructions, and the one or more computer instructions are to be called and executed by the one or more processing components; and the one or more processing components are adapted to:

receive at least one to-be-migrated dirty page transmitted by a source end;

parse round number flag information in the at least one to-be-migrated dirty page, to determine the iteration round number corresponding to the at least one to-be-migrated dirty page; and sequentially restore dirty page data in the at least one to-be-migrated dirty page to a destination memory based on the iteration round number in the at least one to-be-migrated dirty page.

According to a thirteenth aspect, an embodiment of this application provides a computer-readable storage medium storing a computer program, where when the computer program is executed by a computer, the memory migration method according to the first aspect is implemented.

According to a fourteenth aspect, an embodiment of this application provides a computer-readable storage medium storing a computer program, where when the computer program is executed by a computer, the memory migration method according to the second aspect is implemented.

According to a fifteenth aspect, an embodiment of this application provides a computer-readable storage medium storing a computer program, where when the computer program is executed by a computer, the memory migration method according to the third aspect is implemented.

According to a sixteenth aspect, an embodiment of this application provides a computer-readable storage medium storing a computer program, where when the computer program is executed by a computer, the memory migration method according to the fourth aspect is implemented.

In the embodiments of this application, a processing thread, a sending thread, and a traversal thread for a memory region are created, and the different threads iteratively execute respective operations independently, and add round number flag information in dirty pages, so that even if dirty pages at different rounds have not sequentially arrived at a destination end, the destination end can sequentially restore dirty page data based on the round number flag information in the dirty pages, ensuring memory consistency. By creating a variety of threads, a transmit end does not need to consider order preservation. Different threads can execute different processing operations in parallel at a same time point. Different threads do not need to be synchronized with or wait for each other, and the overall migration process will not be blocked by a slower processing operation, thereby improving the efficiency and success rate of memory migration.

These and other aspects of this application will be more concise and comprehensible in the description of the following embodiments.

BRIEF DESCRIPTION OF DRAWINGS

To describe the technical solutions in the embodiments of this application or in the prior art more clearly, the following briefly describes the accompanying drawings for describing the embodiments or the prior art. The accompanying drawings in the following description show some embodiments of this application, and persons of ordinary skill in the art may still derive other drawings from these accompanying drawings without creative efforts.

FIG. 5 is a schematic diagram of time allocation for memory migration in a possible implementation according to an embodiment of this application;

FIG. 7 is a schematic diagram of time allocation for memory migration in another possible implementation according to an embodiment of this application;

DESCRIPTION OF EMBODIMENTS

Figure 1:
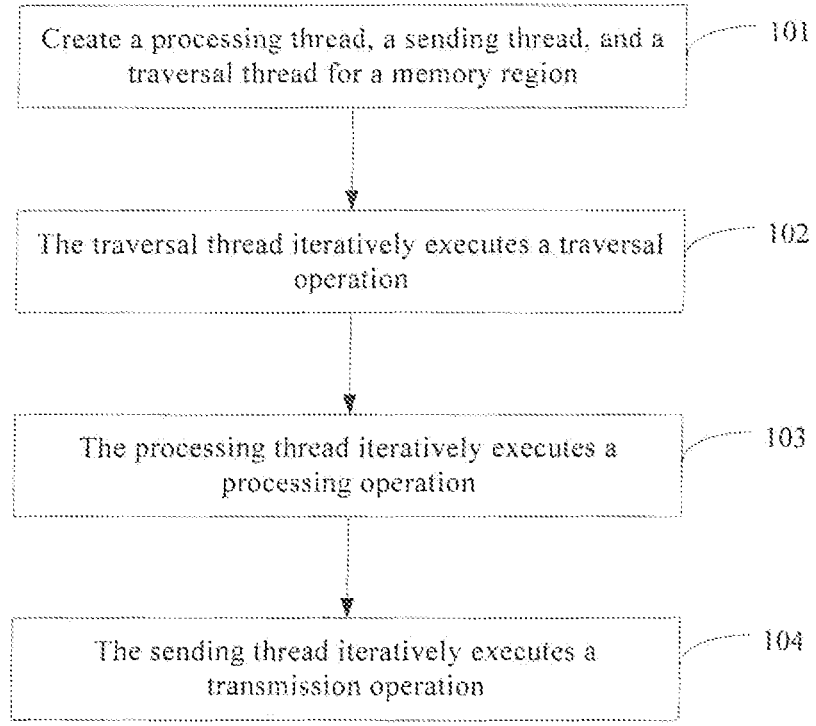
FIG. 1 is a flowchart of an embodiment of a memory migration method according to this application.

To make persons skilled in the art understand the technical solutions in this application better, the following clearly and completely describes the technical solutions in the embodiments of this application with reference to the accompanying drawings in the embodiments of this application.

The flows described in the specification, claims, and accompanying drawings of this application include a plurality of operations in a specific order. However, it should be clearly understood that the operations can be executed in an order different from the order in the specification, or may be executed in parallel, and that the operation numbers such as 101 and 102 are only used to differentiate different operations, but do not represent any precedence. In addition, the flows may include more or fewer operations, and the operations can be executed in order or in parallel. It should be noted that the descriptions "first", "second" and the like in the specification are used to differentiate different messages, devices, modules and the like, but neither represent a precedence order, nor define that "first" and "second" are different types.

Embodiments of this application are applied to a virtual machine live migration scenario. The virtual machine live migration is time-demanding and requires that the total migration time to be as short as possible. Memory migration in the virtual machine live migration process is the most time-consuming. Therefore, how to optimize the memory migration process and improve memory migration efficiency is a main technical problem to be resolved by the present invention.

For ease of understanding, technical terms that may appear in the embodiments of this application will be explained first in the following.

Virtual machine (Virtual Machine): refers to a software-simulated complete computer system having complete hardware system functions and running in a completely isolated environment.

Virtual machine live migration: refers to a process of migrating a running virtual machine from one physical machine to another, during which the virtual machine can still provide services externally. The virtual machine live migration mainly includes live migrations of CPU, memory, and input/output (IO).

Memory iterative copy: is a memory migration manner in the virtual machine live migration process, in which all memory pages are copied by a migration thread to a destination end in the first round, then dirty pages from a previous round are copied to the destination end in each round until the number of the remaining dirty pages converges to a threshold, the source virtual machine is suspended, and all the remaining dirty pages are copied to a destination virtual machine.

Dirty page: refers to a memory page in which data generated in a previous round has been modified during a memory iterative copy process.

Dirty bitmap (dirty bitmap): is used to record which memory pages are dirty pages. Each bit in the dirty bitmap corresponds to a memory page. If a memory page is dirty, it is marked as 1, otherwise it is marked as 0 in an exemplary implementation.

Dirty page flag: is identification information at the header of a dirty page, used to indicate a dirty page address, data length, and the like.

At present, memory migration is executed by a migration thread, and after a round of iteration is completed, a next round of iteration proceeds. During each round of iteration, a plurality of processing operations such as traversing the dirty bitmap, acquiring dirty page data, and transmitting the dirty page data are performed. If a problem occurs in any one processing operation, a "barrel effect" will be caused, affecting the overall migration efficiency. In practical applications, in order to reduce the amount of transmitted data and improve the data transmission efficiency, so as to improve the memory migration efficiency, a compression thread may be created to compress the dirty page data for transmission. However, the migration thread can start transmission only after the compression thread completes the compression. A problem of the compression thread also affects the overall migration efficiency. In addition, in an actual service running process, there often exists a very large memory, and a large number of dirty pages are generated during the migration. If the memory migration efficiency is too low, memory iteration fails to converge, making it impossible to achieve virtual machine live migration ultimately. In the case that the compression thread has completed the current round of data compression and the migration thread starts transmission, the migration thread may not execute a next round of iteration before the transmission is completed. As a result, the compression thread stays in a waiting state and cannot be fully utilized, leading to waste of resources.

The inventors have found in research that iterations in the memory migration process needs to be executed in order, so the migration thread needs to complete one round of iteration operations before starting a next round of iteration operations. Otherwise, it may occur at the destination end that dirty pages in an earlier round are delayed in reaching the destination end, and the delayed dirty pages overwrite dirty pages in a new round, causing memory inconsistency between a source virtual machine and a destination virtual machine. Therefore, according to the prior-art memory migration method, before proceeding to a next round of iteration, the source end needs to ensure that all dirty pages in the current round are sent out.

To improve memory migration efficiency, and ensure memory consistency between the source end and the destination end, the inventors have carried out a series of research and put forward the technical solution of this application. In the embodiments of this application, a processing thread, a sending thread, and a traversal thread for a memory region are created, and the different threads iteratively execute respective operations independently, and add round number flag information for identifying an iteration round number to dirty pages, so that even if dirty pages at different rounds do not sequentially arrive at a destination end, the destination end can restore dirty page data based on the round number flag information in the dirty pages, ensuring memory consistency. By setting the round number flag information for identifying the iteration round number, and creating a variety of threads, the transmit end does not need to consider order preservation. Different threads can execute different processing operations in parallel at a same time point. Different threads do not need to be synchronized with or wait for each other, and the overall migration process will not be blocked by a slower processing operation, eliminating the "barrel effect", and thereby improving the efficiency and success rate of memory migration. Also, different threads iteratively execute respective operations at full load, improving resource utilization.

The following describes the technical solutions in the embodiments of this application with reference to the accompanying drawings in the embodiments of this application. The described embodiments are only some rather than all of the embodiments of this application. All other embodiments obtained by those skilled in the art based on the embodiments of this application without creative efforts shall fall within the protection scope of this application.

FIG. 1 is a flowchart of an embodiment of a memory migration method according to this application. The method may include the following steps.

101: Create a processing thread, a sending thread, and a traversal thread for a memory region. In a possible implementation, a source memory acts as the memory region. The source memory refers to a memory corresponding to a source virtual machine. A source end may refer to a host machine providing a source virtual machine, or a computing device providing a running environment for the source virtual machine. In another possible implementation, for a very large source memory, a source memory may be divided into a plurality of memory regions, and different memory regions do not overlap each other. Therefore, for each memory region, memory migration may be executed according to the technical solution of this embodiment. In the case that the source memory is divided into a plurality of memory regions, different memory regions may share at least one processing thread and at least one sending thread. Certainly, a set of processing threads and a set of sending threads may alternatively be separately created for each memory region. Therefore, the creating a processing thread, a sending thread, and a traversal thread for any memory region may include: creating for the memory region a traversal thread, a sending thread, and a processing thread. In a possible implementation, a processing thread and a sending thread may be created for one memory region, or a processing thread and a sending thread may be correspondingly created for each memory region. In another possible implementation, to further improve memory migration efficiency, a plurality of processing threads and a plurality of sending threads, that is, a set of processing threads and a set of sending threads, may be created for one memory region, or a set of processing threads (including a plurality of processing threads) and a set of sending threads (including a plurality of sending threads) are correspondingly created for each memory region.

102: The traversal thread iteratively executes a traversal operation. The traversal operation includes traversing a dirty bitmap of the memory region and assigning a dirty page address to a corresponding processing thread. Optionally, the traversal operation may specifically include: traversing a dirty bitmap of the memory region to determine a dirty page address and an iteration round number; and assigning the dirty page address and the iteration round number to the processing thread. Since traversing a dirty bitmap may obtain a plurality of dirty page addresses, if there are a plurality of processing threads, the plurality of dirty page addresses may be distributed to a plurality of processing threads. The traversal thread executes the traversal operation for each iteration. After the traversal operation in each round of iteration is completed, that is, after the dirty page addresses are assigned to the processing threads, a next round of iteration may proceed without synchronization with other threads or waiting for other threads. The dirty page address may include a block address and a memory address, where the memory address may indicate which page that is obtained by conversion according to the dirty bitmap is a dirty page, and the block address indicates on which memory block the dirty page is located.

The virtual machine manages a memory in a form of memory pages. Each bit in the dirty bitmap corresponds to a memory page, and is set based on a storage location of a memory page. Therefore, a corresponding memory page address may be determined based on each bit in the dirty bitmap. Dirty pages may be marked in the dirty bitmap. For example, if a value of a bit is 1, it indicates that the corresponding memory page is a dirty page.

The traversal thread is responsible for traversing the dirty bitmap, and a memory region corresponds to only one traversal thread, so that the traversal thread can also know the current iteration round number.

The dirty bitmap is controlled by a virtual machine monitor. Optionally, the traversal thread may synchronize the dirty bitmap from the virtual machine monitor. Therefore, the traversal operation may also include synchronizing the dirty bitmap. After the dirty bitmap is synchronized, an operation of traversing the dirty bitmap and subsequent operations are executed.

103: The processing thread iteratively executes a processing operation.

The processing operation includes reading dirty page data based on the assigned dirty page address, and adding round number flag information to the dirty page data to generate a to-be-migrated dirty page. The round number flag information is used to identify its corresponding iteration round number, and the iteration round number may be determined by the traversal thread and informed to the processing thread.

When a plurality of processing threads are created, the plurality of processing threads run in parallel, and iteratively execute the processing operation separately. Each processing thread iteratively executes the processing operation. The traversal thread may be responsible for assigning to-be-processed tasks to a plurality of processing threads, and an assigned processing task obtained by each processing thread includes an address of a to-be-processed dirty page and its corresponding iteration round number. Therefore, each processing thread may execute the processing operation, that is, reading dirty page data based on the assigned dirty page address, and adding round number flag information for identifying a corresponding iteration round number to the dirty page data to generate a to-be-migrated dirty page.

Optionally, the traversal thread may assign corresponding to-be-processed tasks to one or more processing threads with free resources. Each to-be-processed task may include at least one dirty page address. The number of to-be-processed dirty page addresses to be assigned to each processing thread may be determined in consideration of the number of remaining resources for each processing thread.

When each processing thread is executing the processing operation, the traversal thread keeps iteratively executing the traversal operation. Therefore, a same processing thread may be assigned to-be-processed dirty page addresses in different iteration rounds.

A to-be-migrated dirty page includes dirty page data and a dirty page flag. The dirty page data is read from a memory page corresponding to the dirty page address, and the dirty page flag is added at the header to form a to-be-migrated dirty page. A destination end may restore the dirty page data based on the dirty page address in the dirty page flag, a data length, and other information. Therefore, optionally, round number flag information for identifying a corresponding iteration round number may be added to the dirty page flag, and the dirty page flag and the dirty page data constitute a to-be-migrated dirty page.

In this embodiment of this application, round number flag information for identifying an iteration round number is added to the dirty page flag, so that the iteration round number can be determined based on the round number flag information.

In one implementation, the round number flag information may directly be an Arabic numeral indicating the iteration round number, and the iteration round number starts counting from the number 1.

In another implementation, the round number flag information may be time stamp information. The time stamp information may indicate synchronization time or traversal time of the dirty bitmap, or the like. Because during synchronization or traversal, a next round of iteration may proceed only after the current round is completed, the iteration round number may also be determined based on the sequence of the time stamps.

Certainly, other methods may also be used to identify the iteration round number, and this is not specifically limited in this application.

104: The sending thread iteratively executes a transmission operation.

The transmission operation includes sending at least one to-be-migrated dirty page to a destination end. Each sending thread may send at least one to-be-migrated dirty page to the destination end.

Each processing thread may assign a generated to-be-migrated dirty page to the sending thread.

Optionally, when a plurality of sending threads are created, the to-be-migrated dirty pages may be assigned for each sending thread in consideration of free resources for each sending thread. A plurality of sending threads run in parallel, and iteratively execute the transmission operation separately.

In addition, each processing thread may also cache the generated to-be-migrated dirty pages to a dirty page cache queue corresponding to each processing thread, so that each sending thread is responsible for sending the to-be-migrated dirty pages in its corresponding dirty page cache queue. Each dirty page cache queue may correspond to at least one processing thread and at least one sending thread.

The destination end may sequentially restore respective dirty page data to destination memories based on iteration round numbers in different to-be-migrated dirty pages.

The destination end may receive to-be-migrated dirty pages sent by different sending threads, and each sending thread may send to-be-migrated dirty pages in different iteration rounds. The destination end only needs to parse the to-be-migrated dirty pages to obtain the iteration round numbers, and then may sequentially restore the dirty page data to the destination memory based on a sequence of the iteration round numbers.

In this embodiment, the round number flag information for identifying the iteration round number is added to the dirty page data, and each operation in the memory iteration process is executed by an independent thread, so that the operations in the memory migration process can be executed concurrently in a streamlined form. Because there is round number flag information indicating the iteration round number in the dirty page, the independent threads do not need to be synchronized with or wait for each other, and the overall migration process will not be blocked due to an operation being cached, so that the "barrel effect" is removed. This also ensures that each thread can run at full load, greatly improving the efficiency and success rate of memory migration.

In addition, in order to improve data transmission efficiency and reduce an amount of transmitted data, the processing operation executed by the processing thread may further include compressing the dirty page data, which means that the processing thread may execute a compression operation.

Therefore, in some embodiments, specifically, the processing thread iteratively executes the following processing operation:
  reading dirty page data based on the assigned dirty page address;
  compressing the dirty page data; and
  adding round number flag information for identifying a corresponding iteration round number to the compressed dirty page data to generate a to-be-migrated dirty page.

Each processing thread iteratively executes the foregoing processing operation.

In this case, the compressed dirty page data is stored in the to-be-migrated dirty page, so that an amount of transmitted data can be reduced. The destination end may execute a decompression operation to obtain the dirty page data, and then execute a restoration.

It is also can be learned from the foregoing description that the traversal thread may synchronize the dirty bitmap from the virtual machine monitor. To further improve memory migration efficiency, in some embodiments, the method may further include:
  creating a synchronization thread for the memory region; where
  the synchronization thread iteratively executes a synchronization operation.

The synchronization operation includes acquiring a dirty bitmap of the memory region and sending the dirty bitmap to the traversal thread. In addition, the iteration round number may also be sent to the traversal thread.

To be specific, the synchronization operation may be iteratively executed by an independent thread, so that the synchronization operation and the traversal operation can also be executed concurrently.

In some embodiments, when a plurality of processing threads are created, specifically, the traversal thread iteratively executes the following traversal operation:
  traversing a dirty bitmap of the memory region to determine a dirty page address and an iteration round number; and
  assigning, based on the number of to-be-processed dirty pages, corresponding to-be-processed tasks to one or more processing threads with free resources, where the to-be-processed task includes the iteration round number and at least one to-be-processed dirty page address.

When the traversal thread is responsible for assigning the to-be-processed tasks, it may take the number of to-be-processed dirty pages in the current round into account. In consideration of load balancing, one or more processing threads with free resources may be assigned corresponding to-be-processed tasks. Therefore, the to-be-processed dirty page addresses obtained by the processing threads may be different.

The number of to-be-processed dirty pages is determined by traversing the dirty bitmap, for example, may refer to the number of 1s in the dirty bitmap.

In some embodiments, specifically, the processing thread iteratively executes the following processing operation:

reading dirty page data based on the assigned dirty page address;

adding round number flag information for identifying a corresponding iteration round number to the dirty page data to generate a to-be-migrated dirty page; and caching the to-be-migrated dirty page to a dirty page cache page corresponding to the processing thread.

Therefore, specifically, the sending thread iteratively executes the following sending operation:

transmitting at least one to-be-migrated dirty page in the dirty page cache queue to a destination end.

In the case that a plurality of processing threads and a plurality of sending threads are created, each processing thread may correspond to a dirty page cache queue, each sending thread may be responsible for one or more dirty page cache queues, and each sending thread may transmit at least one to-be-migrated dirty page in its corresponding dirty page cache queue to the destination end.

As long as each sending thread finds a to-be-migrated dirty page cached in the dirty page cache queue, it may send at least one to-be-migrated dirty page in the dirty page cache queue to the destination end. The number of to-be-migrated dirty pages sent by each sending thread may be determined by sending performance of each sending thread.

In practical applications, because a virtual machine runs in a physical machine, and the physical machine may include one or more processing components, including hardware such as CPU, FPGA, FAT card, all threads may be executed by the CPU, and certainly, may be executed respectively by a plurality of processing components. Therefore, in some embodiments, the creating at least one sending thread, at least one processing thread, and a traversal thread for any one of the memory regions may include:

creating a sending thread, a processing thread, and a traversal thread for a memory region in one or more processing components.

In the case that a sending thread, a processing thread, and a traversal thread for a memory region are created in a plurality of processing components, each processing component may create only one type of thread, and certainly, may alternatively create one or more types of threads.

Figure 2:
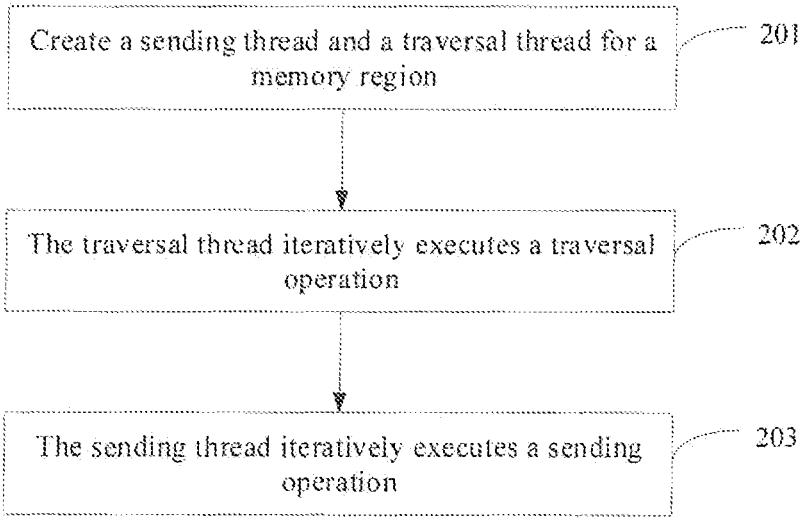
FIG. 2 is a flowchart of another embodiment of a memory migration method according to this application.

In practical applications, if data compression is not required, acquiring dirty page data and adding a dirty page flag to the dirty page data can be performed quickly without a bottleneck problem. Therefore, in this case, it may be unnecessary to create an independent processing thread responsible for processing operations which may be executed by a traversal thread. Therefore, as another embodiment, FIG. 2 is a flowchart of another embodiment of a memory migration method according to this application. The method may include the following steps.

201: Create a sending thread and a traversal thread for a memory region.

In a possible implementation, a source memory may act as the memory region.

In another possible implementation, for a very large source memory, a source memory may be divided into a plurality of memory regions, and different memory regions do not overlap each other. Therefore, for each memory region, memory migration may be executed according to the technical solution of this embodiment.

In the case that the source memory is divided into a plurality of memory regions, different memory regions may share a sending thread. Certainly, a sending thread may alternatively be created separately for each memory region. Therefore, the creating a sending thread and a traversal thread for a memory region may include:

creating for the memory region a traversal thread and a sending thread.

Specifically, a plurality of sending threads may be created for each memory region.

202: The traversal thread iteratively executes a traversal operation.

The traversal operation includes traversing a dirty bitmap of the memory region, reading dirty page data based on a dirty page address, and adding round number flag information to the dirty page data to generate a to-be-migrated dirty page.

By traversing a dirty bitmap, the dirty page address and the iteration round number can be determined, so that dirty page data can be read based on the dirty page address, and round number flag information for identifying the iteration round number can be added to the dirty page data to generate a to-be-migrated dirty page.

Optionally, the traversal thread may synchronize the dirty bitmap from the virtual machine monitor. Therefore, the traversal operation may also include synchronizing the dirty bitmap. After the dirty bitmap is synchronized, an operation of traversing the dirty bitmap of the memory region and subsequent operations are executed.

203: The sending thread iteratively executes a sending operation.

The transmission operation includes sending the to-be-migrated dirty page to a destination end. Optionally, one or more to-be-migrated dirty pages may be sent to the destination end in consideration of sending performance.

The destination end is adapted to sequentially restore respective dirty page data to destination memories based on iteration round numbers in different to-be-migrated dirty pages.

When a plurality of sending threads are created, the plurality of sending threads may run in parallel, and iteratively execute the transmitting operation respectively.

The traversal thread may assign a plurality of generated to-be-migrated dirty pages to a plurality of sending threads. Optionally, the assignment may be executed in consideration of free resources for each sending thread, and the number of dirty pages assigned to each sending thread may be determined in consideration of sending performance of each sending thread.

In addition, the traversal thread can cache the generated to-be-migrated dirty pages to a dirty page cache queue with free resources, so that each sending thread can send the to-be-migrated dirty page in the dirty page cache queue.

A plurality of dirty page cache queues may be set. When a plurality of sending threads are created, each of the dirty page cache queues may correspond to at least one sending thread. In this way, each sending thread may be responsible for sending the to-be-migrated dirty pages in its corresponding dirty page cache queue, and each dirty page cache queue may correspond to at least one sending thread.

In this embodiment, the round number flag information for identifying the iteration round number is added to the dirty page data, and each operation in the memory iteration process is executed by an independent thread, so that the operations in the memory migration process can be executed concurrently in a streamlined form. Because there is round number flag information indicating the iteration round number in the dirty page, the independent threads do not need to be synchronized with or wait for each other, and the overall migration process will not be blocked due to an operation being cached, so that the "barrel effect" is removed. This also ensures that each thread can run at full load, greatly improving the efficiency and success rate of memory migration.

In some embodiments, the method may further include:
creating a synchronization thread for the memory region; where
the synchronization thread iteratively executes a synchronization operation, where the synchronization operation includes acquiring a dirty bitmap of the memory region and sending the dirty bitmap to the traversal thread. In addition, the iteration round number may also be sent to the traversal thread.

In some embodiments, when a plurality of sending threads are included, specifically, the traversal thread iteratively executes the following traversal operation:
traversing a dirty bitmap of the memory region to determine a dirty page address and an iteration round number;
reading dirty page data based on the dirty page address;
adding round number flag information for identifying the iteration round number to the dirty page data to generate a to-be-migrated dirty page; and
separately assigning, based on the number of to-be-processed dirty pages, at least one to-be-migrated dirty page to one or more sending threads with free resources.

In some embodiments, a source memory is divided into a plurality of memory regions, and the creating a sending thread and a traversal thread for a memory region includes:
creating for the memory region a traversal thread and a sending thread. To be specific, a corresponding traversal thread and sending thread are created for each memory region.

In some embodiments, the creating a sending thread and a traversal thread for a memory region may include:
creating a sending thread and a traversal thread for a memory region in one or more processing components.

In addition, an embodiment of this application further provides a memory migration method, which may include:
creating a processing thread, a sending thread, a traversal thread, and a synchronization thread for a memory region, where a source memory may be divided into at least one memory region, and different memory regions do not overlap each other; where
the synchronization thread iteratively executes a synchronization operation, where the synchronization operation includes acquiring a dirty bitmap of the memory region and sending the dirty bitmap to a corresponding traversal thread;
the traversal thread iteratively executes a traversal operation, where the traversal operation includes traversing an assigned dirty bitmap and assigning a dirty page address to the processing thread;
the processing thread iteratively executes a processing operation, where the processing operation includes reading dirty page data based on the assigned dirty page address, and adding round number flag information for identifying a corresponding iteration round number to the dirty page data to generate a to-be-migrated dirty page; and
the sending thread iteratively executes a transmission operation, where the transmission operation includes sending the to-be-migrated dirty page to a destination end, and the destination end sequentially restores respective dirty page data to destination memories based on iteration round numbers in different to-be-migrated dirty pages.

To be specific, in the case that a synchronization thread is created for a memory region, a plurality of traversal threads may be created for concurrent execution, further improving memory migration efficiency.

Certainly, in an implementation, because a traversal operation does not take too much time, consumes few resources, and can be completed quickly, a traversal thread may be created for each memory region. For the specific implementation, reference may be made to the above description. Certainly, only one traversal thread may alternatively be created, and a plurality of memory regions share one traversal thread.

A plurality of processing threads, a plurality of sending threads and a plurality of traversal threads may be specifically created.

The plurality of traversal threads run in parallel, and iteratively execute the traversal operation separately; the plurality of processing threads run in parallel, and iteratively execute the processing operation separately; and the plurality of sending threads run in parallel, and iteratively execute the sending operation separately.

Figure 3:
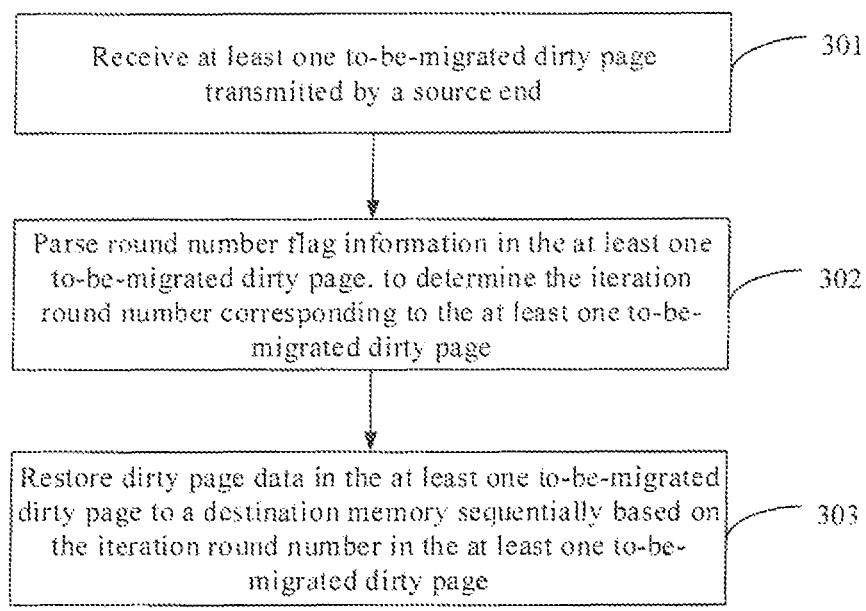
FIG. 3 is a flowchart of another embodiment of a memory migration method according to this application.

FIG. 3 is a flowchart of another embodiment of a memory migration method according to an embodiment of this application. In this embodiment, a technical solution of this application is described from the respective of a destination end. The destination end may refer to a host machine of a destination virtual machine, or a computing device providing a running environment for the destination virtual machine.

The method may include the following steps.

301: Receive at least one to-be-migrated dirty page transmitted by a source end.

Optionally, it may be receiving at least one to-be-migrated dirty page transmitted by a sending thread of the source end. In the case that there are a plurality of sending threads in the source end, to-be-migrated dirty pages transmitted by all the sending threads may be received separately.

For acquiring and sending a to-be-migrated dirty page at the source end, reference may be made to the description of the above embodiments, and details are not described herein again.

In a possible implementation, a to-be-migrated dirty page may include a dirty page flag and a dirty page data structure, where the dirty page flag includes flag information for identifying iteration round number corresponding to the dirty page data.

In another possible implementation, a to-be-migrated dirty page may include a dirty page flag and a compressed dirty page data structure, where the dirty page flag includes round number flag information for identifying iteration round number corresponding to the dirty page data.

In addition, the dirty page flag may further include original dirty page information, for example, a dirty page address and a data length.

302: Parse round number flag information in the at least one to-be-migrated dirty page, to determine the iteration round number corresponding to the at least one to-be-migrated dirty page.

303: Sequentially restore dirty page data in the at least one to-be-migrated dirty page to a destination memory based on the iteration round number in the at least one to-be-migrated dirty page.

The dirty page data may be obtained by parsing the to-be-migrated dirty page, and the iteration round number corresponding to the dirty page data may be determined based on the round number flag information.

Then, based on a sequence of the iteration round numbers, respective dirty page data may be restored to the destination memories sequentially.

In this embodiment, the round number flag information for identifying the iteration round numbers is added to the dirty page data, and the destination end may determine, after receiving the to-be-migrated pages, the iteration round numbers based on the round number flag information, so that the dirty page data in the to-be-migrated dirty pages can be restored to the destination memories sequentially, ensuring memory consistency. In addition, each operation in the memory iteration process is executed by an independent thread at the source end, so that the operations in the memory migration process can be executed concurrently in a streamlined form, and the overall migration process will not be blocked due to an operation being cached, greatly improving the efficiency and success rate of memory migration.

One or more threads may also be created at the destination end to execute the operations of the above step 301 to step 303. As an alternative, the method may further include:
creating a receiving thread and a restoration thread,
where the receiving thread iteratively executes a receiving operation, including receiving at least one to-be-migrated dirty page transmitted by a source end, and parsing round number flag information in the at least one to-be-migrated dirty page to determine the iteration round number corresponding to the at least one to-be-migrated dirty page; and
the restoration thread iteratively executes a restoration operation of sequentially restoring dirty page data in the at least one to-be-migrated dirty page to a destination memory based on the iteration round number in the at least one to-be-migrated dirty page.

A plurality of receiving threads and a plurality of restoration threads may be created. A plurality of receiving threads may run in parallel, and iteratively execute the receiving operation separately; and a plurality of restoration threads may run in parallel, and iteratively execute the restoration operation separately.

To ensure accuracy of restoration, the plurality of restoration threads need to restore the dirty page data for to-be-migrated dirty pages in a same round. After restoration of the dirty page data in the same round is completed, the plurality of restoration threads will execute restoration of dirty page data in a next round. To be specific, a plurality of to-be-migrated dirty pages in the same round can be distributed to a plurality of restoration threads to restore dirty page data, as long as different restoration threads are restoring the to-be-migrated dirty pages in the same round at the same time.

However, a plurality of receiving threads may parse the to-be-migrated dirty pages in different rounds, without considering iteration round numbers in the to-be-migrated dirty pages.

In some embodiments, the sequentially restoring dirty page data in the at least one to-be-migrated dirty page to a destination memory based on the iteration round number in the at least one to-be-migrated dirty page may include:
caching the at least one to-be-migrated dirty page to a receiving cache queue corresponding to a respective iteration round number; and
sequentially restoring dirty page data in to-be-migrated dirty pages in different receiving cache queues to destination memories based on the iteration round numbers.

Therefore, the receiving thread may iteratively execute a receiving operation, including receiving at least one to-be-migrated dirty page transmitted by a source end, parsing round number flag information in the at least one to-be-migrated dirty page, to determine the iteration round number corresponding to the at least one to-be-migrated dirty page, and putting the at least one to-be-migrated dirty page into a receiving cache queue corresponding to a respective iteration round number.

The restoration thread iteratively executes a restoration operation of sequentially restoring dirty page data in to-be-migrated dirty pages in different receiving cache queues to destination memories based on the iteration round numbers.

In the case that the dirty page data in the to-be-migrated dirty page is compressed, optionally, the sequentially restoring dirty page data in to-be-migrated dirty pages in different receiving cache queues to destination memories based on the iteration round numbers may include:
sequentially decompressing and restoring the dirty page data in the to-be-migrated dirty pages in the different receiving cache queues to the destination memories based on the iteration round numbers.

For ease of understanding, the technical solution of this application is described separately from the perspectives of dividing a source memory into one memory region and a plurality of memory regions (in the following, two memory regions are used as an example for description in most cases).

For a small source memory, the number of dirty pages does not increase much during an iterative copy process. Therefore, the source memory can act as a memory region for memory migration without affecting overall migration efficiency.

Assuming that data compression operations are required, a traversal thread, a set of compression threads, a set of sending threads, and a synchronization thread may be created at the source end.

The set of compression threads may include one or more compression threads, and the set of sending threads may include one or more sending threads.

Figure 4:
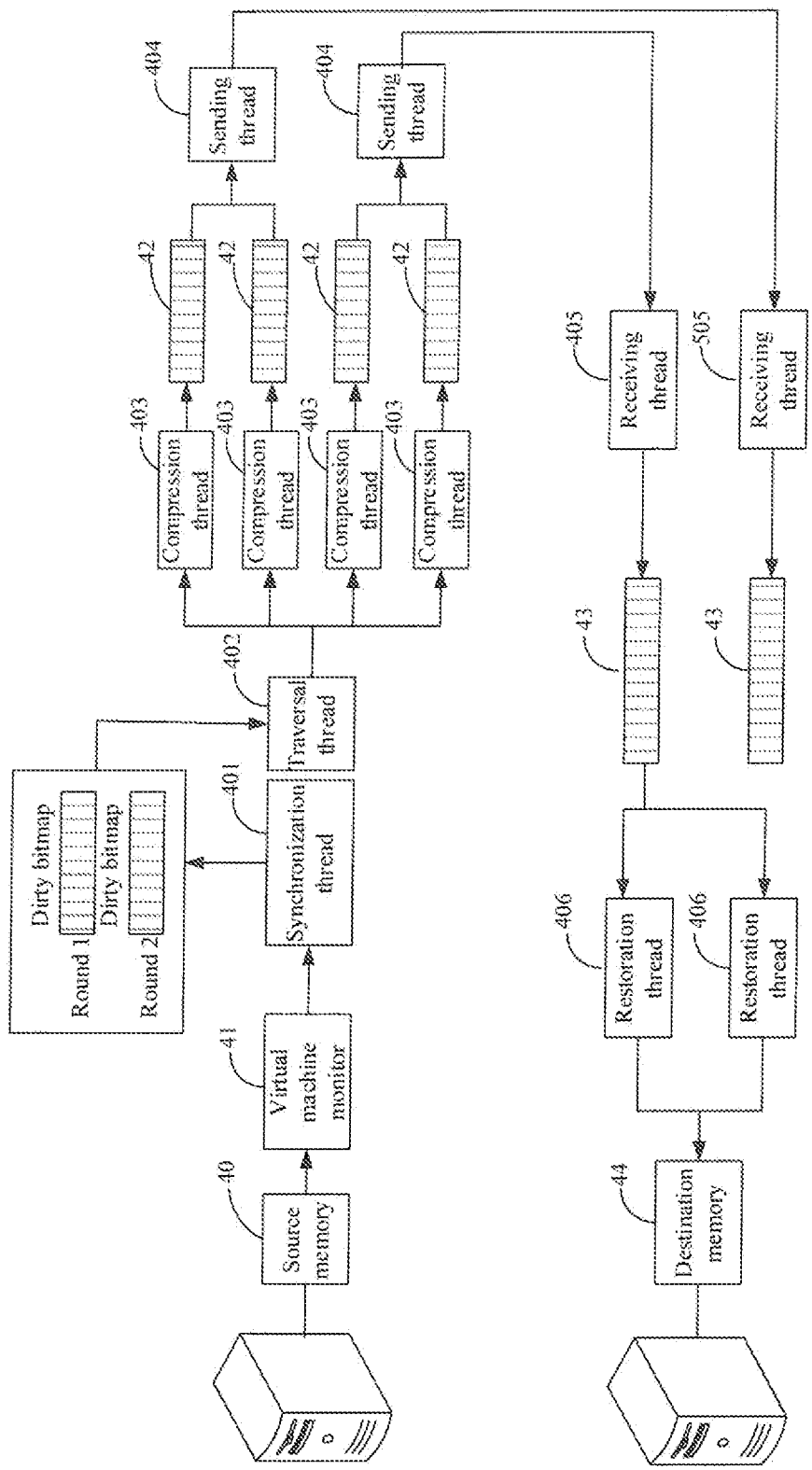
FIG. 4 is a schematic diagram of memory migration interaction in one practical application according to an embodiment of this application.

Reference may be made to the schematic diagram of memory migration interaction in FIG. 4.

For a source memory 40 at a source end, a synchronization thread 401 is responsible for iteratively executing a synchronization operation, where the synchronization operation includes synchronizing a dirty bitmap of the source memory from a virtual machine monitor 41, and sending the dirty bitmap and corresponding iteration round number to a traversal thread 402. Each time the synchronization thread 401 executes the synchronization operation, the iteration round number may be increased by one.

The traversal thread 402 is responsible for iteratively executing the iteration operation, where the traversal operation includes traversing the dirty bitmap to determine a dirty page address and an iteration round number, and assigning the dirty page address and the iteration round number to a corresponding compressed thread.

A plurality of compression threads 403 may be included, and each compression thread 403 is responsible for iteratively executing a compression operation. The compression operation may include reading dirty page data based on any one of the assigned dirty page addresses; compressing the dirty page data; adding a dirty page flag to the compressed dirty page data to generate a to-be-migrated dirty page; and caching the to-be-migrated dirty page to a corresponding dirty page cache queue. The dirty page flag includes round number flag information for identifying an iteration round number.

As can be learned from FIG. 4 that the traversal thread 402 may distribute a plurality of dirty page addresses in the same round to the plurality of compression threads 403 for processing, and may determine a processing quantity of each compression thread in consideration of remaining resources.

After each compression thread 403 completes the compression, the to-be-migrated dirty pages will be cached to their respective dirty page cache queues 42. Because each compression thread 403 may process the to-be-migrated dirty pages of different rounds, a dirty page cache queue may also include the to-be-migrated dirty pages corresponding to different iteration rounds.

Thereafter, each sending thread 404 may be responsible for iteratively executing a sending operation, that is, sending at least one to-be-migrated dirty page in the corresponding dirty page cache queue 42 to the destination end.

The destination end may create a receiving thread 405, a restoration thread 406, and the like, where a plurality of receiving threads 405 and restoration thread 406 may be included.

Each receiving thread 405 is responsible for iteratively executing a receiving operation; where the receiving operation may include receiving at least one to-be-migrated dirty page sent by a source end, parsing each to-be-migrated dirty page to obtain round number flag information and dirty page data; and caching the dirty page data to a receiving cache queue 43 corresponding to the round number flag information.

Therefore, the dirty page data of a same round is cached into a same receiving cache queue 43, and only the dirty page data of the same round is cached in the same receiving cache queue 43.

The restoration thread 406 may be responsible for iteratively executing a restoration operation, where the restoration operation may include: sequentially restoring the dirty page data from the receiving cache queue 43 to a destination memory 44 of the destination end based on the iteration round number.

In the case that there are a plurality of restoration threads, the dirty page data in the same receiving cache queue 43 can be distributed to the plurality of restoration threads for restoration. After the plurality of restoration threads restore all the dirty page data in one receiving cache queue, they restore the dirty page data in a next receiving cache queue. The plurality of restoration threads may respectively restore at least part of the dirty page data in the same receiving cache queue.

Because different types of threads can execute different operations in the memory iteration process in parallel at a same time point, the operations in the memory migration process can be executed concurrently in a streamlined form, greatly improving the efficiency and success rate of memory migration.

In the schematic diagram of time allocation in the memory iteration process shown in FIG. 5, it is assumed that each type of thread takes the same time to execute its own operation. As can be learned from FIG. 5, for example, in the time period t3, the sending thread executes the sending operation in round 1, the compression thread may execute the compression operation in round 2 in parallel, the traversal thread may execute the traverse operation in round 3 in parallel, and the synchronization thread may execute the synchronization operation in round 4 in parallel. Five rounds of iterative operations can be completed from time periods t0 to t7, while the prior-art method can complete only two rounds of iterative operations at most. Therefore, with the technical solution in this embodiment of this application, the independent threads do not need to be synchronized with or wait for each other, and the overall migration process will not be blocked due to an operation being cached, ensuring that each thread can run at full load, and greatly improving the efficiency and success rate of memory migration. In addition, because a plurality of sending threads and processing threads may be created, the plurality of processing threads or the plurality of sending threads may run in parallel, further improving memory migration efficiency.

Figure 6:
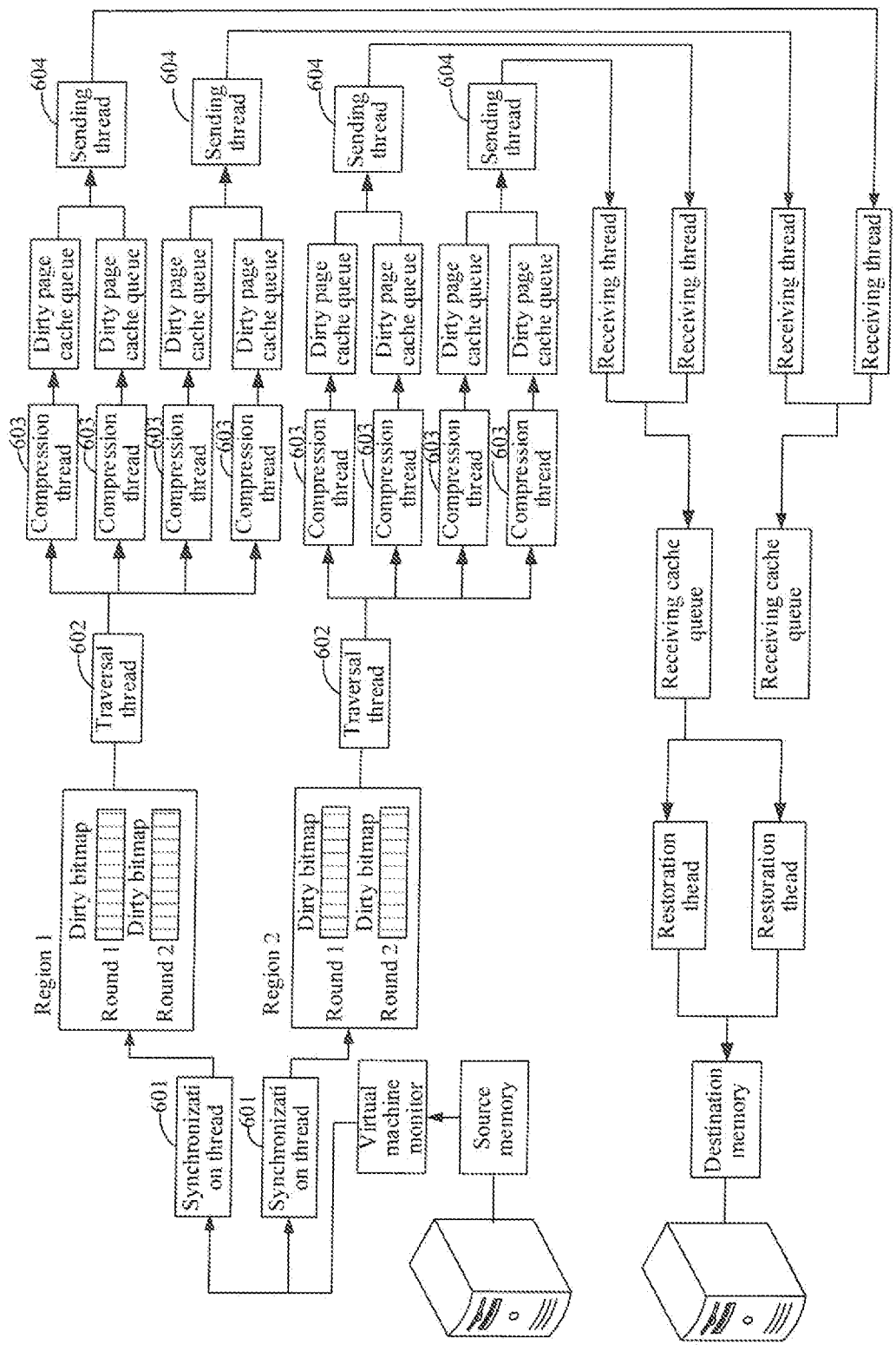
FIG. 6 is a schematic diagram of memory migration interaction in another practical application according to an embodiment of this application.

For a very large source memory, to ensure memory migration efficiency, a source memory may be divided into a plurality of memory regions, and the plurality of memory regions do not overlap each other. Memory iteration can be executed in each memory region according to the scheme shown in FIG. 4. It is assumed that the source memory is divided into two memory regions: region 1 and region 2. In the schematic diagram of memory iteration interaction shown in FIG. 6, the memory iteration process for each memory region at the source end is shown.

For each memory region, a synchronization thread 601, a traversal thread 602, a set of compression threads (including at least one compression thread 603), and a set of sending threads (including at least one sending thread 604) may be created.

Each synchronization thread is only responsible for iteratively executing the synchronization operation for its corresponding memory region, where the synchronization operation also refers to synchronizing the dirty bitmap of its corresponding memory region.

Each traversal thread is only responsible for iteratively executing the iteration operation for its corresponding memory region, where the traversal operation also refers to traversing the dirty bitmap of its corresponding memory region to determine a dirty page address and an iteration round number, and assigning the dirty page address and the iteration round number to a compressed thread corresponding to its corresponding memory region.

For compression threads corresponding to the same memory region, each compression thread may be only responsible for iteratively executing a compression operation for its corresponding memory region, that is, reading dirty page data based on the assigned dirty page address; compressing the dirty page data; adding a dirty page flag to the compressed dirty page data to generate a to-be-migrated dirty page; and caching the to-be-migrated dirty page to a corresponding dirty page cache queue. The dirty page flag includes round number flag information for identifying an iteration round number.

For the sending threads corresponding to the same memory region, each sending thread may be only responsible for iteratively executing sending operations for its corresponding memory region, that is, sending at least one to-be-migrated dirty page in its corresponding dirty page cache queue to the destination end.

For the destination end, although the source memory is divided into a plurality of memory regions in the destination end, the plurality of memory regions do not overlap each other, and the dirty page address of each dirty page will not change. The destination end only needs to know the dirty page address to execute the restoration of the dirty page data, and finally the dirty page data will be restored to different memory regions of the destination memory without being overwritten. Therefore, the operation executed at the destination end is the same as that executed at the destination end shown in FIG. 4, there is no need to know a memory region to which each to-be-migrated dirty page belongs, and no region-based restoration is required. For specific restoration process, reference may be made to FIG. 4, and details are not described herein again.

In the process of memory iteration, by determining whether the number of remaining dirty pages in the memory has converged to a threshold, it can be determined whether the number of remaining dirty pages in each memory region has converged to a threshold. If yes, it is determined that the memory iteration convergence succeeds. In this case, the virtual machine at the source end is suspended, and then subsequent live migration operations are executed. The subsequent live migration operations are the same as the prior art, and will not be described herein.

By dividing a memory into a plurality of memory regions, the plurality of memory regions may concurrently execute memory iteration migration, increasing the memory iteration efficiency by many times. For example, in the case that a memory is divided into two memory regions, compared with the scheme shown in FIG. 4, two rounds of iteration may be completed in the same time, doubling the memory iteration efficiency.

In the schematic diagram of time allocation in the memory iteration process shown in FIG. 7, it is assumed that each type of thread takes the same time to execute its own operation, and that a source memory is divided into two memory regions. As can be learned from FIG. 6, in each time unit, two same operations may be executed in parallel. Memory regions are independent of each other without mutual impact. The independent threads in each memory region do not need to be synchronized with or wait for each other, and the overall migration process will not be blocked due to an operation being cached, ensuring that each independent thread can run at full load, and therefore greatly improving the efficiency and success rate of memory migration.

Figure 8:
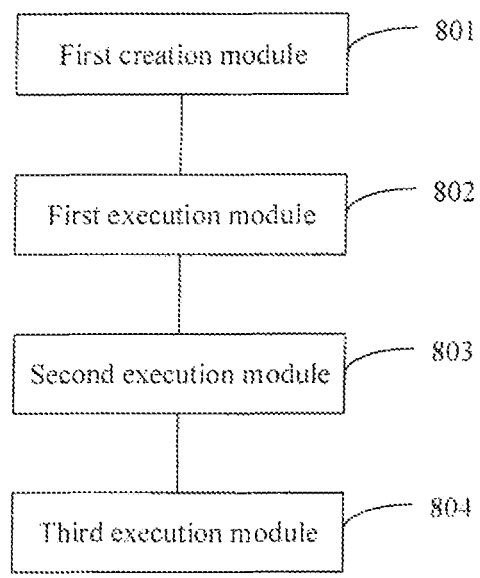
FIG. 8 is a schematic structural diagram of an embodiment of a memory migration apparatus according to this application.

FIG. 8 is a schematic structural diagram of an embodiment of a memory migration apparatus according to this application, where the apparatus may include:

a first creation module 801 adapted to create a processing thread, a sending thread, and a traversal thread for a memory region;

a first execution module 802 adapted to control the traversal thread to iteratively execute a traversal operation, where the traversal operation includes traversing a dirty bitmap of the memory region and assigning a dirty page address to a corresponding processing thread;

a second execution module 803 adapted to control the processing thread to iteratively execute a processing operation, where the processing operation includes reading dirty page data based on the assigned dirty page address, and adding round number flag information to the dirty page data to generate a to-be-migrated dirty page; and a third execution module 804 adapted to control the sending thread to iteratively execute a transmission operation, where the transmission operation includes sending the to-be-migrated dirty page to a destination end, and the destination end sequentially restores respective dirty page data to destination memories based on iteration round numbers in different to-be-migrated dirty pages.

In some embodiments, the processing operation that the second execution module controls the at least one processing thread to iteratively execute may include:
reading dirty page data based on the assigned dirty page address;
compressing the dirty page data; and
adding round number flag information for identifying a corresponding iteration round number to the compressed dirty page data to generate a to-be-migrated dirty page.

In some embodiments, the first creation module is further adapted to create a synchronization thread for the memory region.

The apparatus may further include:
a synchronization execution module adapted to control the synchronization thread to iteratively execute a synchronization operation, where the synchronization operation includes acquiring a dirty bitmap of any one of the memory regions and sending the dirty bitmap to the traversal thread.

In some embodiments, the traversal operation that the first execution module controls the traversal thread to execute specifically includes:
traversing a dirty bitmap of the memory region to determine a dirty page address and an iteration round number; and
assigning, based on the number of to-be-processed dirty pages, corresponding to-be-processed tasks to one or more processing threads with free resources, where the to-be-processed task includes the iteration round number and at least one to-be-processed dirty page address.

In some embodiments, the processing operation that the second execution module controls the processing thread to iteratively execute may include:
reading dirty page data based on the assigned dirty page address;
adding round number flag information for identifying a corresponding iteration round number to the dirty page data to generate a to-be-migrated dirty page; and
caching the to-be-migrated dirty page to a dirty page cache page corresponding to the processing thread.

In some embodiments, the transmission operation that the third execution module controls the sending threads to iteratively execute may specifically include:
transmitting at least one to-be-migrated dirty page in the dirty page cache queue to a destination end.

In some embodiments, the first creation module is specifically adapted to create for the memory region a traversal thread, a sending thread, and a processing thread.

In some embodiments, the first creation module is specifically adapted to create a sending thread, a processing thread, and a traversal thread for a memory region in one or more processing components.

A plurality of processing threads, a plurality of sending threads and a plurality of traversal threads may be specifically created.

The plurality of traversal threads run in parallel, and iteratively execute the traversal operation separately; the plurality of processing threads run in parallel, and iteratively execute the processing operation separately; and the plurality of sending threads run in parallel, and iteratively execute the sending operation separately.

A source memory is divided into the plurality of the memory regions, and different memory regions do not overlap each other.

The memory migration apparatus in FIG. 8 may execute the memory migration method in the embodiment of FIG. 1, and the implementation principle and technical effects are not described herein again. For the memory migration apparatus in the foregoing embodiment, specific manners of executing operations by each module or unit are described in detail in the embodiments related to the method, and no details are repeated herein.

Figure 9:
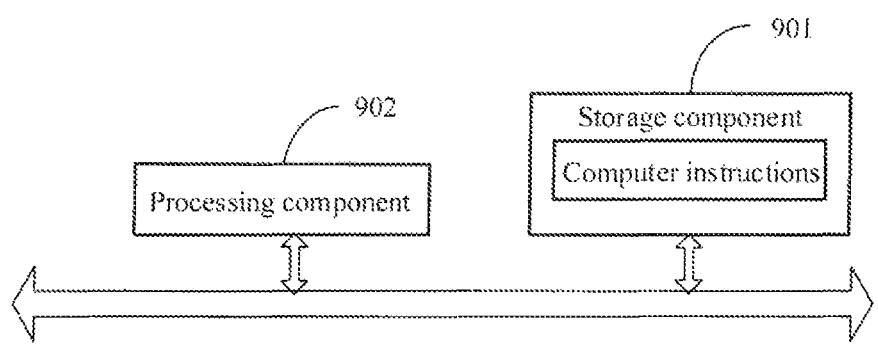
FIG. 9 is a schematic structural diagram of an embodiment of a computing device according to this application.

In a possible design, the memory migration apparatus in the embodiment shown in FIG. 8 may be implemented as a computing device, where the computing device is a source virtual machine, that is, a host machine of the to-be-migrated virtual machine. As shown in FIG. 9, the computing device may include one or more storage components 901 and one or more processing components 902.

The one or more storage components 901 store one or more computer instructions, where the one or more computer instructions are to be called and executed by the one or more processing components 902.

The one or more processing components 902 are adapted to:
  create a processing thread, a sending thread, and a traversal thread for a memory region; where
  the traversal thread iteratively executes a traversal operation, where the traversal operation includes traversing a dirty bitmap of the memory region and assigning a dirty page address to a corresponding processing thread;
  the processing thread iteratively executes a processing operation, where the processing operation includes reading dirty page data based on the assigned dirty page address, and adding round number flag information to the dirty page data to generate a to-be-migrated dirty page; and
  the sending thread iteratively executes a transmission operation, where the transmission operation includes sending the to-be-migrated dirty page to a destination end, and the destination end sequentially restores respective dirty page data to destination memories based on iteration round numbers in different to-be-migrated dirty pages.

The processing thread, the sending thread, and the traversal thread can be created respectively in different processing components.

The one or more processing components 902 may include central processing units (CPU), digital signal processors (DSP), digital signal processing devices (DSPD), programmable logic devices (PLD), field programmable gate arrays (FPGA), controllers, microcontrollers, microprocessors, or other electronic components.

The one or more storage components 901 are adapted to store various types of data to support operations on the computing device. The one or more storage components may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

Certainly, the computing device may also include other components, such as input/output interfaces and communication components.

An input/output interface provides an interface between a processing component and a peripheral interface module. The peripheral interface module may be an output device, an input device, or the like.

The communication component is adapted to facilitate wired or wireless communication between the computing device and other devices.

An embodiment of this application further provides a computer-readable storage medium storing a computer program thereon, where when the computer program is executed by a computer, the memory migration method in the embodiment shown in FIG. 1 can be implemented.

Figure 10:
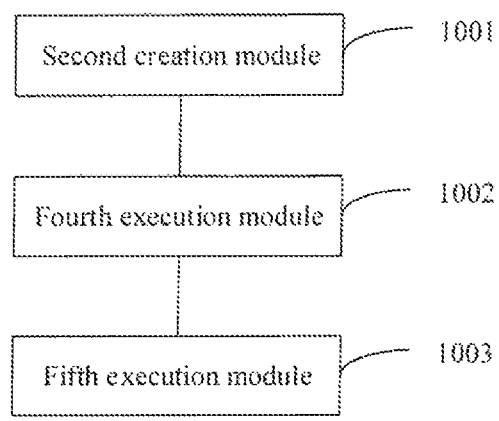
FIG. 10 is a schematic structural diagram of another embodiment of a memory migration apparatus according to this application.

FIG. 10 is a schematic structural diagram of another embodiment of a memory migration apparatus according to embodiments of this application. The apparatus may include:
  a second creation module 1001 adapted to create a sending thread and a traversal thread for a memory region, where a source memory may be divided into at least one memory region, and different memory regions do not overlap each other;
  a fourth execution module 1002 adapted to control the traversal thread to iteratively execute a traversal operation, where the traversal operation includes traversing a dirty bitmap of the memory region, reading dirty page data based on a dirty page address, and adding round number flag information to the dirty page data to generate a to-be-migrated dirty page; and
  a fifth execution module 1003 adapted to control the sending thread to iteratively execute a transmission operation, where the transmission operation includes sending the to-be-migrated dirty page to a destination end, and the destination end sequentially restores respective dirty page data to destination memories based on iteration round numbers in different to-be-migrated dirty pages.

In some embodiments, the second creation module may be further adapted to create a synchronization thread for any one of the memory regions.

The apparatus may further include:
  a synchronization execution module adapted to control the synchronization thread to iteratively execute a synchronization operation, where the synchronization operation includes acquiring a dirty bitmap of any one of the memory regions and sending the dirty bitmap to the traversal thread.

In some embodiments, the traversal operation that the fourth execution module controls the traversal thread to iteratively execute may include:
  traversing a dirty bitmap of the memory region to determine a dirty page address and an iteration round number;
  reading dirty page data based on the dirty page address;
  adding round number flag information for identifying the iteration round number to the dirty page data to generate a to-be-migrated dirty page; and
  separately assigning, based on the number of to-be-processed dirty pages, at least one to-be-migrated dirty page to one or more sending threads with free resources.

In some embodiments, the second creation module is specifically adapted to create for the memory region a traversal thread and a sending thread.

In some embodiments, the second creation module is specifically adapted to create a sending thread and a traversal thread for a memory region in one or more processing components.

The memory migration apparatus in FIG. 10 may execute the memory migration method in the embodiment of FIG. 2, and the implementation principle and technical effects are not described herein again. For the memory migration apparatus in the foregoing embodiment, specific manners of executing operations by each module or unit are described in detail in the embodiments related to the method, and no details are repeated herein.

Figure 11:
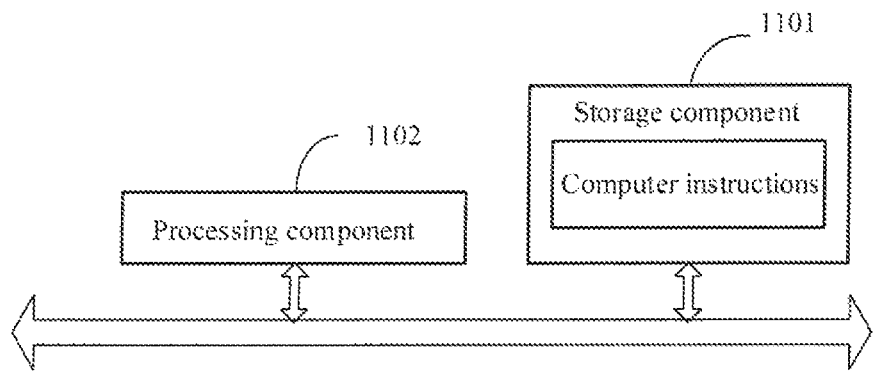
FIG. 11 is a schematic structural diagram of another embodiment of a computing device according to this application.

In a possible design, the memory migration apparatus in the embodiment shown in FIG. 10 may be implemented as a computing device, where the computing device is a source virtual machine, that is, a host machine of the to-be-migrated virtual machine. As shown in FIG. 11, the computing device may include one or more storage components 1101 and one or more processing components 1102.

The one or more storage components 1101 store one or more computer instructions, where the one or more computer instructions are to be called and executed by the one or more processing components 1102.

The one or more processing components 1102 are adapted to:

create a sending thread and a traversal thread for a memory region, where a source memory may be divided into at least one memory region, and different memory regions do not overlap each other, where the traversal thread iteratively executes a traversal operation, where the traversal operation includes traversing a dirty bitmap of the memory region, reading dirty page data based on a dirty page address, and adding round number flag information to the dirty page data to generate a to-be-migrated dirty page; and the sending thread iteratively executes a transmission operation, where the transmission operation includes sending the to-be-migrated dirty page to a destination end, and the destination end sequentially restores respective dirty page data to destination memories based on iteration round numbers in different to-be-migrated dirty pages.

The sending thread, and the traversal thread can be created respectively in different processing components.

The one or more processing components 1102 may include central processing units (CPU), digital signal processors (DSP), digital signal processing devices (DSPD), programmable logic devices (PLD), field programmable gate arrays (FPGA), controllers, microcontrollers, microprocessors, or other electronic components.

The one or more storage components 1101 are adapted to store various types of data to support operations on the computing device. The one or more storage components may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

Certainly, the computing device may also include other components, such as input/output interfaces and communication components.

An input/output interface provides an interface between a processing component and a peripheral interface module. The peripheral interface module may be an output device, an input device, or the like.

The communication component is adapted to facilitate wired or wireless communication between the computing device and other devices.

An embodiment of this application further provides a computer-readable storage medium storing a computer program thereon, where when the computer program is executed by a computer, the memory migration method in the embodiment shown in FIG. 2 can be implemented.

In addition, an embodiment of this application further provides a memory migration apparatus, including:

a third creation module adapted to create a processing thread, a sending thread, a traversal thread, and a synchronization thread for a memory region, where a source memory may be divided into at least one memory region, and different memory regions do not overlap each other, a sixth execution module adapted to control the synchronization thread to iteratively execute a synchronization operation, where the synchronization operation includes acquiring a dirty bitmap of the memory region and sending the dirty bitmap to a traversal thread;

a seventh execution module adapted to control the traversal thread to iteratively execute a traversal operation, where the traversal operation includes traversing an assigned dirty bitmap and assigning the dirty page address to a corresponding processing thread;

an eighth execution module adapted to control the processing thread to iteratively execute a processing operation, where the processing operation includes reading dirty page data based on the assigned dirty page address, and adding round number flag information to the dirty page data to generate a to-be-migrated dirty page; and a ninth execution module adapted to control the at least one sending thread to iteratively execute a transmission operation, where the transmission operation includes sending the to-be-migrated dirty page to a destination end, and the destination end sequentially restores respective dirty page data to destination memories based on iteration round numbers in different to-be-migrated dirty pages.

In a possible design, the apparatus may be implemented as a computing device, where the computing device is a source virtual machine, that is, a host machine of the to-be-migrated virtual machine. The computing device may include one or more storage components and one or more processing components.

The one or more storage components store one or more computer instructions, where the one or more computer instructions are to be called and executed by the one or more processing components.

The one or more processing components are adapted to:

create a processing thread, a sending thread, a traversal thread, and a synchronization thread for a memory region, where a source memory may be divided into at least one memory region, and different memory regions do not overlap each other; where the synchronization thread iteratively executes a synchronization operation, where the synchronization operation includes acquiring a dirty bitmap of the memory region and sending the dirty bitmap to the traversal thread.

the traversal thread iteratively executes a traversal operation, where the traversal operation includes traversing an assigned dirty bitmap and assigning a dirty page address to a corresponding processing thread;

the processing thread iteratively executes a processing operation, where the processing operation includes reading dirty page data based on the assigned dirty page address, and adding round number flag information to the dirty page data to generate a to-be-migrated dirty page; and the sending thread iteratively executes a transmission operation, where the transmission operation includes sending the to-be-migrated dirty page to a destination end, and the destination end sequentially restores respective dirty page data to destination memories based on iteration round numbers in different to-be-migrated dirty pages.

Figure 12:
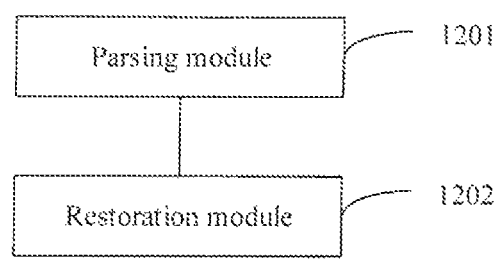
FIG. 12 is a schematic structural diagram of another embodiment of a memory migration apparatus according to this application.

FIG. 12 is a schematic structural diagram of another embodiment of a memory migration apparatus according to embodiments of this application. The apparatus may include:

a parsing module 1201 adapted to receive at least one to-be-migrated dirty page transmitted by a source end, and parse round number flag information in the at least one to-be-migrated dirty page, to determine the iteration round number corresponding to the at least one to-be-migrated dirty page; and a restoring module 1202 adapted to sequentially restore dirty page data in the at least one to-be-migrated dirty page to a destination memory based on the iteration round number in the at least one to-be-migrated dirty page.

In some embodiments, the restoration thread is specifically adapted to cache the at least one to-be-migrated dirty page to a receiving cache queue corresponding to a respective iteration round number; and sequentially restore dirty page data in to-be-migrated dirty pages in different receiving cache queues to destination memories based on the iteration round numbers.

In some embodiments, the restoration thread is specifically adapted to sequentially decompress and restore dirty page data in to-be-migrated dirty pages in different receiving cache queues to destination memories based on the iteration round numbers.

In some embodiments, the apparatus further includes:

a fourth creation module adapted to create a receiving thread and a restoration thread.

The parsing module specifically controls the receiving thread to iteratively execute a receiving operation, including receiving at least one to-be-migrated dirty page transmitted by a source end, parsing round number flag information in the at least one to-be-migrated dirty page, to determine the iteration round number corresponding to the at least one to-be-migrated dirty page, and putting the at least one to-be-migrated dirty page into a receiving cache queue corresponding to a respective iteration round number.

The restoration thread module specifically controls the restoration thread to iteratively execute a restoration operation of sequentially restoring dirty page data in to-be-migrated dirty pages in different receiving cache queues to destination memories based on the iteration round numbers.

The memory migration apparatus in FIG. 12 may execute the memory migration method in the embodiment of FIG. 3, and the implementation principle and technical effects are not described herein again. For the memory migration apparatus in the foregoing embodiment, specific manners of executing operations by each module or unit are described in detail in the embodiments related to the method, and no details are repeated herein.

Figure 13:
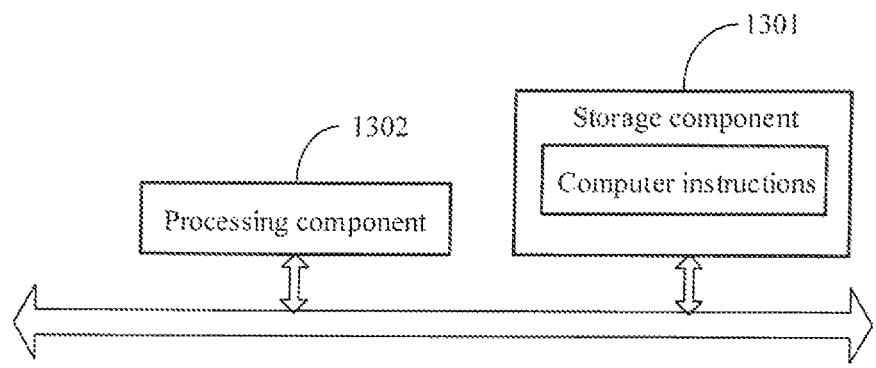
FIG. 13 is a schematic structural diagram of another embodiment of a computing device according to this application.

In a possible design, the memory migration apparatus in the embodiment shown in FIG. 12 may be implemented as a computing device, where the computing device is a host machine of the destination virtual machine. As shown in FIG. 13, the computing device may include one or more storage components 1301 and one or more processing components 1302.

The one or more storage components 1301 store one or more computer instructions, where the one or more computer instructions are to be called and executed by the one or more processing components 1302.

The one or more processing components 1302 are adapted to:

receive at least one to-be-migrated dirty page transmitted by a source end;

parse round number flag information in the at least one to-be-migrated dirty page, to determine the iteration round number corresponding to the at least one to-be-migrated dirty page; and sequentially restore dirty page data in the at least one to-be-migrated dirty page to a destination memory based on the iteration round number in the at least one to-be-migrated dirty page.

The one or more processing components 1302 may include central processing units (CPU), digital signal processors (DSP), digital signal processing devices (DSPD), programmable logic devices (PLD), field programmable gate arrays (FPGA), controllers, microcontrollers, microprocessors, or other electronic components.

The one or more storage components 1301 are adapted to store various types of data to support operations on the computing device. The one or more storage components may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

Certainly, the computing device may also include other components, such as input/output interfaces and communication components.

An input/output interface provides an interface between a processing component and a peripheral interface module. The peripheral interface module may be an output device, an input device, or the like.

The communication component is adapted to facilitate wired or wireless communication between the computing device and other devices.

An embodiment of this application further provides a computer-readable storage medium storing a computer program thereon, where when the computer program is executed by a computer, the memory migration method in the embodiment shown in FIG. 3 can be implemented.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

The described apparatus embodiments are merely examples. The units described as separate parts may or may not be physically separated, and parts shown as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of this application without creative efforts.

According to the description of the foregoing implementations, persons skilled in the art can clearly understand that the implementations may be implemented by software in addition to a necessary universal hardware platform or by hardware only. Based on such an understanding, the technical solutions essentially or the part contributing to the prior art may be implemented in a form of a software product. The software product is stored in a computer-readable storage medium, such as a ROM/RAM, a magnetic disk, or an optical disc, and includes several instructions for instructing a computer device (which may be a personal computer, a server, or a network device) to perform the methods described in the embodiments or some parts of the embodiments.

In conclusion, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. A memory migration method, comprising:
creating a processing thread, a sending thread, and a traversal thread for a memory region; wherein:
the traversal thread iteratively executes a traversal operation, wherein the traversal operation comprises traversing a dirty bitmap of the memory region and assigning a dirty page address to a corresponding processing thread,
the processing thread iteratively executes a processing operation, wherein the processing operation comprises reading dirty page data based on the assigned dirty page address, and adding round number flag information to the dirty page data to generate a to-be-migrated dirty page, and
the sending thread iteratively executes a transmission operation, wherein the transmission operation comprises sending the to-be-migrated dirty page to a destination end.

2. The method according to claim 1, wherein the processing thread specifically iteratively executes the following processing operation:
reading dirty page data based on the assigned dirty page address;
compressing the dirty page data; and
adding round number flag information for identifying a corresponding iteration round number to the compressed dirty page data to generate a to-be-migrated dirty page.

3. The method according to claim 1, further comprising:
creating a synchronization thread for the memory region; wherein
the synchronization thread iteratively executes a synchronization operation, wherein the synchronization operation comprises acquiring a dirty bitmap of the memory region and sending the dirty bitmap to the traversal thread.

4. The method according to claim 1, wherein a plurality of processing threads are specifically created, and the plurality of processing threads run in parallel and iteratively execute the processing operation separately;
the traversal thread specifically iteratively executes the following traversal operation:
traversing a dirty bitmap of the memory region to determine a dirty page address and an iteration round number;
assigning, based on the number of to-be-processed dirty pages, corresponding to-be-processed tasks to one or more processing threads with free resources, wherein the to-be-processed task comprises the iteration round number and at least one to-be-processed dirty page address.

5. The method according to claim 1, wherein the processing thread specifically iteratively executes the following processing operation:
reading dirty page data based on the assigned dirty page address;
adding round number flag information for identifying an iteration round number to the dirty page data to generate a to-be-migrated dirty page; and
caching the to-be-migrated dirty page to a dirty page cache page corresponding to the processing thread.

6. The method according to claim 5, wherein the sending thread specifically iteratively executes the following sending operation:
transmitting a to-be-migrated dirty page in the dirty page cache queue to the destination end.

7. The method according to claim 1, wherein a source memory is divided into a plurality of the memory regions, and different memory regions do not overlap each other; and
wherein the creating the processing thread, the sending thread, and the traversal thread for the memory region comprises:
creating a traversal thread for the memory region, at least one sending thread, and at least one processing thread.

8. The method according to claim 1, wherein the creating the sending thread, the processing thread, and the traversal thread for the memory region comprises:
creating a sending thread, a processing thread, and a traversal thread for a memory region in one or more processing components.

9. The method according to claim 1, wherein a plurality of processing threads and a plurality of sending threads are specifically created; and
wherein the plurality of processing threads run in parallel, and iteratively execute the processing operation separately, and the plurality of sending threads run in parallel, and iteratively execute the transmission operation separately.

10. A memory migration method, comprising:
creating a sending thread and a traversal thread for a memory region; wherein
the traversal thread iteratively executes a traversal operation, wherein the traversal operation comprises traversing a dirty bitmap of the memory region, reading dirty page data based on a dirty page address, and adding round number flag information to the dirty page data to generate a to-be-migrated dirty page, and
the sending thread iteratively executes a transmission operation, wherein the transmission operation comprises sending the to-be-migrated dirty page to a destination end.

11. The method according to claim 10, further comprising:
creating a synchronization thread for the memory region; wherein
the synchronization thread iteratively executes a synchronization operation, wherein the synchronization operation comprises acquiring a dirty bitmap of the memory region and sending the dirty bitmap and the iteration round number to the traversal thread.

12. The method according to claim 10, wherein a plurality of sending threads are specifically created, and the plurality of sending threads run in parallel and iteratively execute the sending operation separately; and the traversal thread specifically iteratively executes the following traversal operation:

traversing a dirty bitmap of the memory region to determine a dirty page address and an iteration round number;

reading dirty page data based on the dirty page address;

adding round number flag information for identifying the iteration round number to the dirty page data to generate a to-be-migrated dirty page; and separately assigning, based on the number of to-be-processed dirty pages, at least one to-be-migrated dirty page to one or more sending threads with free resources.

13. The method according to claim 10, wherein a source memory is divided into a plurality of the memory regions, and different memory regions do not overlap each other; and the creating the sending thread and the traversal thread for the memory region comprises:

creating for the memory region a traversal thread and a sending thread.

14. The method according to claim 10, wherein the creating the sending thread and the traversal thread for the memory region comprises:

creating a sending thread and a traversal thread for a memory region in one or more processing components.

15. The method according to claim 10, wherein a plurality of the sending threads are specifically created; and a plurality of sending threads run in parallel, and iteratively execute the transmission operation separately.

* * * * *